United States Patent
Baliff (10) Patent No.: US 9,656,660 B2
(45) Date of Patent: May 23, 2017

(54) CONTROL SYSTEM FOR VEHICLE DRIVE SYSTEM HAVING SUPERCHARGER AND ACCESSORIES

(71) Applicant: EATON CORPORATION, Cleveland, OH (US)

(72) Inventor: Mark R. Baliff, Galesburg, MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 14/657,330

(22) Filed: Mar. 13, 2015

(65) Prior Publication Data

US 2015/0183421 A1    Jul. 2, 2015

Related U.S. Application Data

(63) Continuation of application No. PCT/US2013/057346, filed on Aug. 29, 2013.

(Continued)

(51) Int. Cl.
*B60W 20/00* (2016.01)
*B60W 10/06* (2006.01)
(Continued)

(52) U.S. Cl.
CPC .......... *B60W 20/108* (2013.01); *B60W 10/06* (2013.01); *B60W 10/08* (2013.01);
(Continued)

(58) Field of Classification Search
CPC ...... B60W 20/00; B60W 10/06; B60W 10/08; B60W 2540/10; F02D 37/02; F02D 41/0087; F02D 41/266; F02D 17/02; F02D 2200/602; F02D 2250/18; F02D 2400/02; F02D 41/1401; F02D 41/1402; F02D 13/04; F02D 2041/2027; Y02T 10/6286;
(Continued)

(56) References Cited

U.S. PATENT DOCUMENTS

| | | | |
|---|---|---|---|
| 8,196,686 B2 | 6/2012 | Grieve | |
| 2005/0182553 A1* | 8/2005 | Miller | F01L 1/46 701/103 |

(Continued)

FOREIGN PATENT DOCUMENTS

| | | |
|---|---|---|
| JP | 2001-323818 A | 11/2001 |
| WO | WO 2011/009693 | 1/2011 |

OTHER PUBLICATIONS

International Search Report for corresponding International Patent Application No. PCT/US2013/057346 mailed Nov. 26, 2013.

*Primary Examiner* — Mussa A Shaawat
*Assistant Examiner* — Sanjeev Malhotra (57) ABSTRACT

A drive system includes a drive belt, an engine, a motor, and a supercharger for delivering compressed air to an intake of the engine, and a controller for setting the operational mode of the drive system. The engine and motor are selectively engageable with the drive belt, and the supercharger is selectively engageable with the motor. A method of controlling an operational mode of such a drive system includes detecting a throttle position. Thereafter, the method includes selectively engaging the engine with the drive belt or the drive belt with the motor or the motor with the supercharger, based at least in part on the throttle position.

16 Claims, 11 Drawing Sheets

Related U.S. Application Data (60) Provisional application No. 61/701,071, filed on Sep. 14, 2012.

(51) Int. Cl.

| | | |
|---|---|---|
| *B60W 10/26* | (2006.01) | |
| *B60W 10/30* | (2006.01) | |
| *F02B 33/34* | (2006.01) | |
| *F02B 39/04* | (2006.01) | |
| *F02B 39/10* | (2006.01) | |
| *F02B 39/12* | (2006.01) | |
| *F02B 67/06* | (2006.01) | |
| *B60W 10/08* | (2006.01) | |
| *B60W 20/10* | (2016.01) | |
| *B60K 25/00* | (2006.01) | |
| *B60K 25/02* | (2006.01) | |
| *B60W 50/02* | (2012.01) | |

(52) U.S. Cl.
CPC ............ *B60W 10/26* (2013.01); *B60W 10/30* (2013.01); *B60W 20/10* (2013.01); *F02B 33/34* (2013.01); *F02B 39/04* (2013.01); *F02B 39/10* (2013.01); *F02B 39/12* (2013.01); *F02B 67/06* (2013.01); *B60K 2025/005* (2013.01); *B60K 2025/022* (2013.01); *B60W 50/02* (2013.01); *B60W 2510/244* (2013.01); *B60W 2520/10* (2013.01); *B60W 2540/10* (2013.01); *Y02T 10/6286* (2013.01); *Y10S 903/93* (2013.01)

(58) Field of Classification Search
CPC ... Y02T 10/46; Y02T 10/6239; Y02T 10/123; Y02T 10/142; Y02T 10/42; Y02T 10/6217; Y02T 10/6255; Y02T 10/7077; B60K 6/445; B60K 31/00; B60K 6/365; B60K 6/52; B60K 2240/445; B60L 11/123; B60L 15/20; B60L 2240/423; B60L 2240/429; B60L 2240/441; B60L 2240/443; B60L 2240/547; B60L 2240/549; B60L 7/14; F02P 5/1512; B60Y 2400/435; F01L 1/46; F01L 9/04; F02B 2075/025; F02B 2075/027; F02B 2075/125; F02B 21/00; F02B 69/06; F02B 75/02; Y10T 477/23
USPC ............ 701/22, 68, 70, 102, 103, 104, 113; 60/565, 608; 123/357, 406.23; 180/54.1, 180/179, 186; 475/5; 318/476; 477/3
See application file for complete search history.

(56) References Cited

U.S. PATENT DOCUMENTS

| | | | |
|---|---|---|---|
| 2006/0052930 A1* | 3/2006 | Froloff | F01L 1/46 701/103 |
| 2006/0090466 A1* | 5/2006 | Kowatari | B60K 6/24 60/608 |
| 2006/0180130 A1 | 8/2006 | St. James | |
| 2007/0000247 A1* | 1/2007 | Perkins | B60T 1/10 60/565 |
| 2007/0150164 A1* | 6/2007 | Froloff | F02D 13/0207 701/103 |
| 2007/0163540 A1* | 7/2007 | Tomatsuri | B60K 6/445 123/357 |
| 2007/0184928 A1* | 8/2007 | Yasui | B60K 6/365 475/5 |
| 2008/0051962 A1* | 2/2008 | Nakai | B60T 8/172 701/70 |
| 2008/0110683 A1* | 5/2008 | Serkh | B60K 25/00 180/54.1 |
| 2008/0142287 A1* | 6/2008 | Simmons | B62M 27/02 180/186 |
| 2008/0315817 A1* | 12/2008 | Yonemori | B60K 6/46 318/476 |
| 2009/0019852 A1 | 1/2009 | Inoue et al. | |
| 2009/0173562 A1* | 7/2009 | Namari | F02D 11/105 180/179 |
| 2010/0050985 A1* | 3/2010 | Tripathi | F02D 41/0087 123/406.23 |
| 2010/0071673 A1 | 3/2010 | Prior | |
| 2010/0087288 A1* | 4/2010 | Yamamoto | B60K 6/445 477/3 |
| 2010/0155157 A1 | 6/2010 | Grieve | |
| 2011/0067395 A1 | 3/2011 | Suhocki | |
| 2011/0094480 A1 | 4/2011 | Suhocki et al. | |
| 2011/0213541 A1* | 9/2011 | Tripathi | F02D 17/02 701/102 |
| 2011/0251773 A1* | 10/2011 | Sahandiesfanjani | F02D 17/02 701/102 |
| 2012/0046853 A1* | 2/2012 | Silvestri | F02D 41/0087 701/104 |
| 2013/0066493 A1* | 3/2013 | Martin | B60W 30/18136 701/22 |
| 2013/0096793 A1* | 4/2013 | Krosschell | F16H 63/50 701/68 |
| 2014/0149023 A1* | 5/2014 | Martin | F02P 9/00 701/113 |
| 2015/0066272 A1* | 3/2015 | Benjey | B60K 6/485 701/22 |

* cited by examiner

FIG. 3D

CONTROL SYSTEM FOR VEHICLE DRIVE SYSTEM HAVING SUPERCHARGER AND ACCESSORIES

CROSS-REFERENCE TO RELATED APPLICATIONS

This application is a Continuation Application of PCT/US2013/057346 filed on Aug. 29, 2013, which claims benefit of U.S. Patent Application Ser. No. 61/701,071 filed on Sep. 14, 2012, and which applications are incorporated herein by reference. To the extent appropriate, a claim of priority is made to each of the above disclosed applications.

INTRODUCTION

Superchargers are used to pressurize air delivered to the intake of an internal combustion engine to increase the engine's power output. Typically, a supercharger is powered mechanically by a belt or chain drive from the engine crankshaft. For this reason, performance of a supercharger is dependent on engine RPM. It may be less desirable to operate a supercharger if, for example, if the engine is operating at a high RPM while under a low load, or at a low RPM under a high load. In such cases, use of the supercharger may be a drain on the engine efficiency. Other drains on an engine's efficiency may be caused by powering of a motor/generator of a hybrid engine system, as well as powering other vehicle accessories.

SUMMARY

In one aspect, the technology relates to a drive system for a vehicle, the drive system including: a drive belt; an engine selectively engageable with the drive belt; a motor selectively engageable with the drive belt; a supercharger for delivering compressed air to an intake of the engine, wherein the supercharger is selectively engageable with the motor; and a controller for setting an operational mode of the drive system, wherein when in a power mode, the controller engages the engine with the drive belt, the controller engages the supercharger with the motor so as to deliver compressed air from the supercharger to the intake of the engine, and the controller disengages the motor from the drive belt; and wherein when in a cruise mode, the controller disengages the engine from the drive belt, the controller engages the supercharger with the motor so as to deliver compressed air from the supercharger to the intake of the engine, and the controller engages the motor with the drive belt.

In another aspect, the technology relates to a method of setting an operational mode of a drive system including a drive belt, an engine, a motor, and a supercharger for delivering compressed air to an intake of the engine, and a controller for setting the operational mode of the drive system, the method including: wherein when in a power mode, the controller engages the engine with the drive belt, the controller engages the supercharger with the motor so as to deliver compressed air from the supercharger to the intake of the engine, and the controller disengages the motor from the drive belt; wherein when in a cruise mode, the controller disengages the engine from the drive belt, the controller engages the supercharger with the motor so as to deliver compressed air from the supercharger to the intake of the engine, and the controller engages the motor with the drive belt; wherein when in a regeneration mode, the controller engages the engine with the drive belt, the controller disengages the supercharger from the motor, and the controller engages the motor with the drive belt; and wherein when in an engine-off mode, the controller engages the motor with the drive belt, the controller disengages the supercharger from the motor, and the controller disengages the supercharger from the motor.

A method of setting an operational mode of a drive system including a drive belt, an engine, a motor, and a supercharger for delivering compressed air to an intake of the engine, and a controller for setting the operational mode of the drive system, the method including: detecting a throttle position; and selectively engaging at least one the engine with the drive belt, the drive belt with the motor, and the motor with the supercharger, based at least in part on the throttle position.

BRIEF DESCRIPTION OF THE DRAWINGS

There are shown in the drawings, embodiments which are presently preferred, it being understood, however, that the technology is not limited to the precise arrangements and instrumentalities shown.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

The technology provides a number of controlled clutches or coupling devices at various components of a vehicle. By coupling and de-coupling selected components from each other during various states of operation, the components may be operated independent of engine rpm, resulting in more efficient operation of the engine, improved performance, and continued operation of certain accessories after vehicle shut down, as desired.

Figure 1:
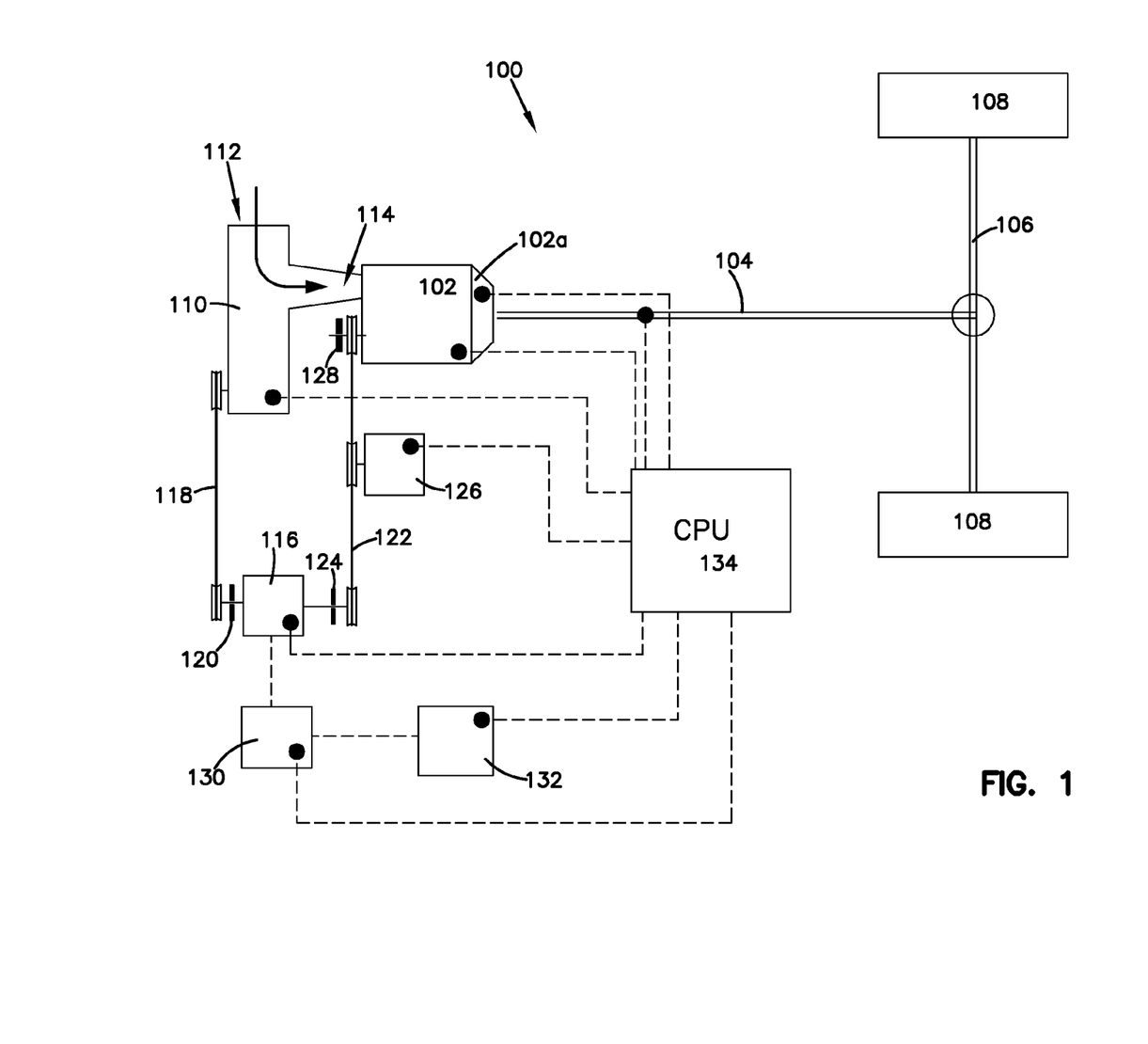
FIG. 1 depicts a vehicle drive system.

FIG. 1 depicts a vehicle drive system 100 including an engine 102 and a number of related components. The engine 102 is connected to a transmission 102a that rotates a drive shaft or axle 104 that, in turn, drives a transaxle 106 and a number of drive wheels 108. The engine 102 is aspirated by a supercharger 110 that includes an air intake 112 and an air discharge 114 into the engine 102. Various types of superchargers are known and the operation and advantages thereof are readily apparent to a person of skill in the art. In the systems and vehicles described herein, virtually any type of supercharger, including roots, twin-screw, sliding vane, and scroll, may be utilized. The supercharger 110 is powered by a hybrid electric motor/generator 116. Operational power from the motor/generator 116 to the supercharger 110 is depicted as being transferred by a supercharger belt 118, which may be selectively engaged by the motor/generator 116 with a supercharger clutch 120. The supercharger belt 118 is but one type of power transfer element that may be utilized in the systems depicted herein. In other embodiments, direct drive connections utilizing a selectively engageable clutch may be used.

The motor/generator 116 is also selectively engageable with a drive belt 122 via a motor clutch 124. The drive belt 122 also provides power for one or more vehicle accessories 126, which may include one or more of an air conditioning compressor, an engine coolant pump, an alternator, a power steering pump, and a brake air compressor. Rotation of the drive belt 122 is provided by the engine 102 in certain operational modes. The engine 102 may be selectively engageable with the drive belt 122 via an engine clutch 128. Returning to the motor/generator 116, a DC-to-AC inverter 130 connects that element to a high voltage power supply/storage element, such as a battery 132 or other energy storage device, such as a super capacitor.

A number of the elements identified above are connected via various sensors to a vehicle CPU 134. For example, sensors may be associated with the engine 102, the transmission 102a, the axle 104, the accessories 124, the motor 116, the supercharger 110, the inverter 130, and the battery 132. Any type of sensor typically used to deliver signals to a vehicle CPU may be utilized with the depicted system 100. Sensors that detect conditions such as requested torque, throttle position, battery state-of-charge, vehicle speed, accessory need condition, airflow rate, temperature, axle rotational speed, available engine torque, catalyst state, grade (i.e., uphill or downhill), etc., may be utilized. Indeed, any sensors may be used in conjunction with any given component of a vehicle, including, but not limited to engine transmission, anti-lock brake system control, power electronics, etc. At least one benefit of the drive system 100 described herein is that existing components, such as superchargers, accessories, batteries, etc., may be used therewith, without requiring redesign of those components. This makes the system 100 extremely simple to incorporate into new vehicle designs or to enhance existing vehicles. A CPU 134 receives signals from the various sensors, determines the operational state of the vehicle and requirements of any components, and actuates the clutches 120, 124, 128 as required or desired for a particular application. The CPU 134 may perform any number of calculations, or process any number of signals, to make its mode selection. Of course, control signals may be sent from the CPU 134 to associated clutch actuators (not shown). The processes utilized by the CPU 134 to control the drive system 100 are described below.

Figure 2A:
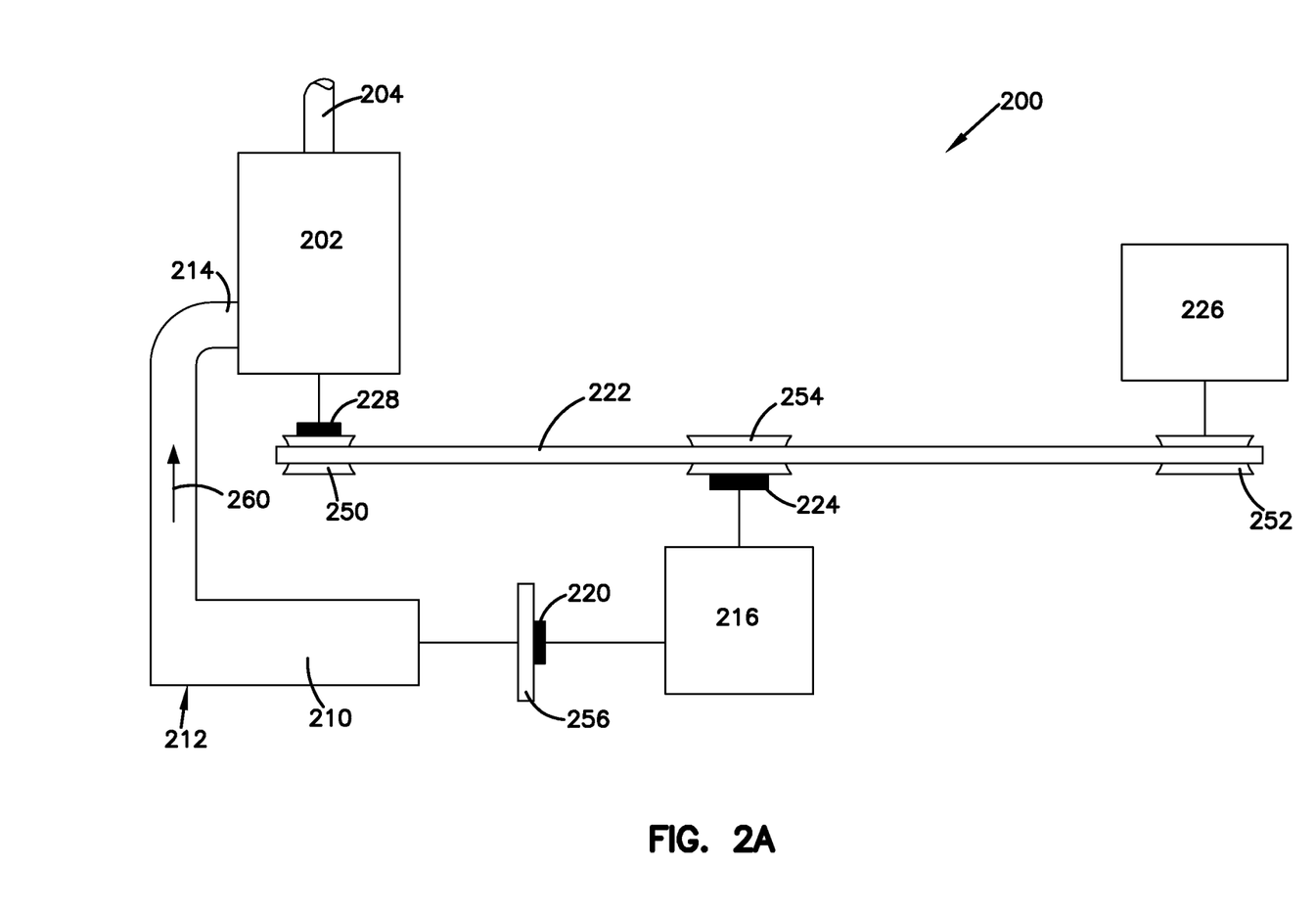
FIG. 2A depicts a vehicle drive system in a default mode.

FIGS. 2A-2E depict a vehicle drive system 200 in various operational modes. Select components previously introduced in FIG. 1 are depicted. The presence of other components (e.g., a CPU, sensors, etc.) in the system 200 would be apparent to a person of skill in the art. The depicted components include an engine 202, a drive shaft or axle 204, a drive belt 222, an electrical accessory 226, a motor/generator 216, and a supercharger 210 having an air intake 212 and an air discharge 214. Additionally, an engine clutch 228, a motor clutch 224, and a supercharger clutch 220 are also depicted. Additional elements include an engine pulley 250, an accessory pulley 252, a motor pulley 254, and a supercharger drive 256. As described previously, a belt system may be used to drive the supercharger 210. The operational mode of the system 200 is determined by the CPU (not shown), which engages and/or disengages the various clutches 220, 224, 228 as required or desired. FIG. 2A depicts the system 200 in a default mode. Relevant to the default mode, each of the engine clutch 228, the motor clutch 224, and the supercharger clutch 220 are engaged with the engine pulley 250, the motor pulley 254, and the supercharger drive 256, respectively. In the default mode, the engine 202 provides power to all of the accessories 226, motor 216, and supercharger 210, via the drive belt 222. Here, the supercharger 210 delivers compressed air 260 to the engine 202, based on the engine RPM. Under certain circumstances it may be more efficient to operate the vehicle drive system 300 in the default mode. Additionally, if a system fault is present that would prevent operation of the vehicle in a different mode, the vehicle will still be operational. This allows the operator to control the vehicle until the system 200 can be serviced and any issues corrected.

Figure 2B:
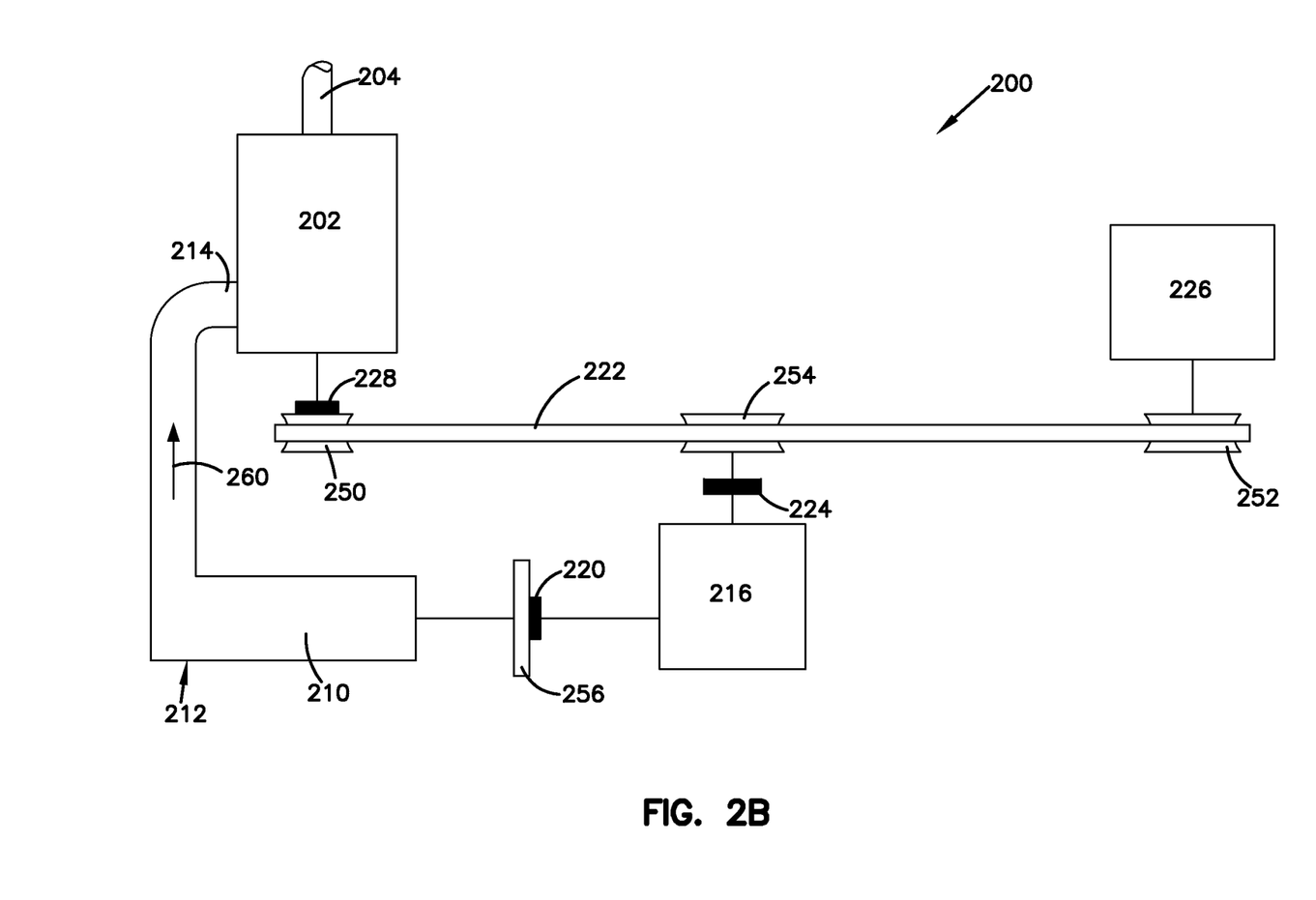
FIG. 2B depicts a vehicle drive system in a power mode.

FIG. 2B depicts the system 200 in a power mode. In the power mode, the engine clutch 228 is engaged with the engine pulley 250, the motor clutch 224 is disengaged from the motor pulley 254, and the supercharger clutch 228 is engaged with the supercharger drive 256. In the power mode, the supercharger 210 may be driven at a desired rate by the motor 216, instead of the mechanical rate delivered by the engine 202, in order to deliver compressed air 260 to the engine 202. This allows torque to be developed faster due to pressurization of the engine air intake by the supercharger 210. Since the supercharger 210 is powered by the motor 216, pressurization is not delayed, which is the case with a supercharger powered by an engine. The power required by the motor 216 to drive the supercharger 210 is provided by the battery (not shown). Power to the vehicle accessories 226 is provided by the engine 202, via the drive belt 222.

Figure 2C:
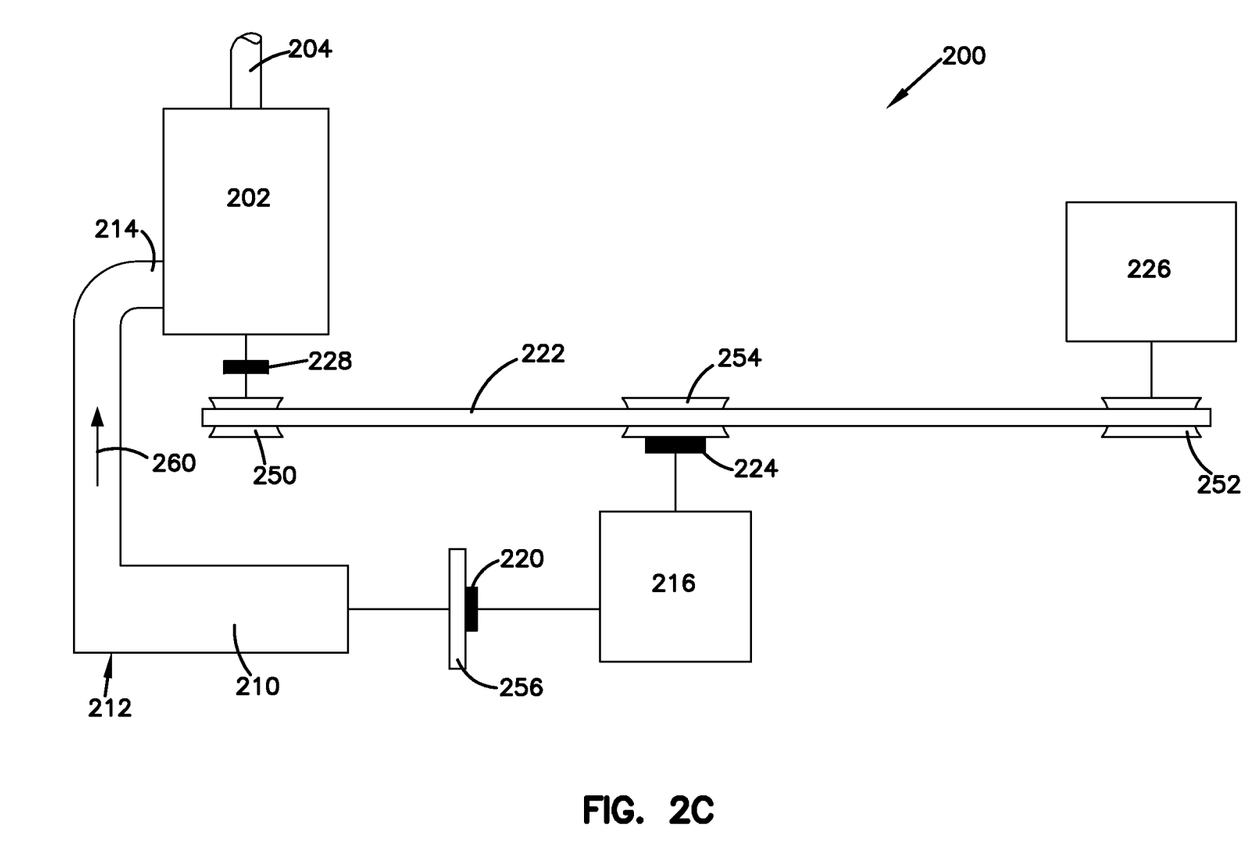
FIG. 2C depicts a vehicle drive system in a cruise mode.

FIG. 2C depicts the system 200 in a cruise mode. In the cruise mode, the engine clutch 228 is disengaged from the engine pulley 250, the motor clutch 224 is engaged with the motor pulley 254, and the supercharger clutch 220 is engaged with the supercharger drive 256. This mode allows a reduction in parasitic losses by allowing the engine 202 to run at a speed independent of the needs of the supercharger 210 and accessories 226. Electrical power from the battery (not shown) to the motor 216 drives both the accessories 226 (via the drive belt 222) and the supercharger 210 (to deliver compressed air 260 to the engine 202).

Figure 2D:
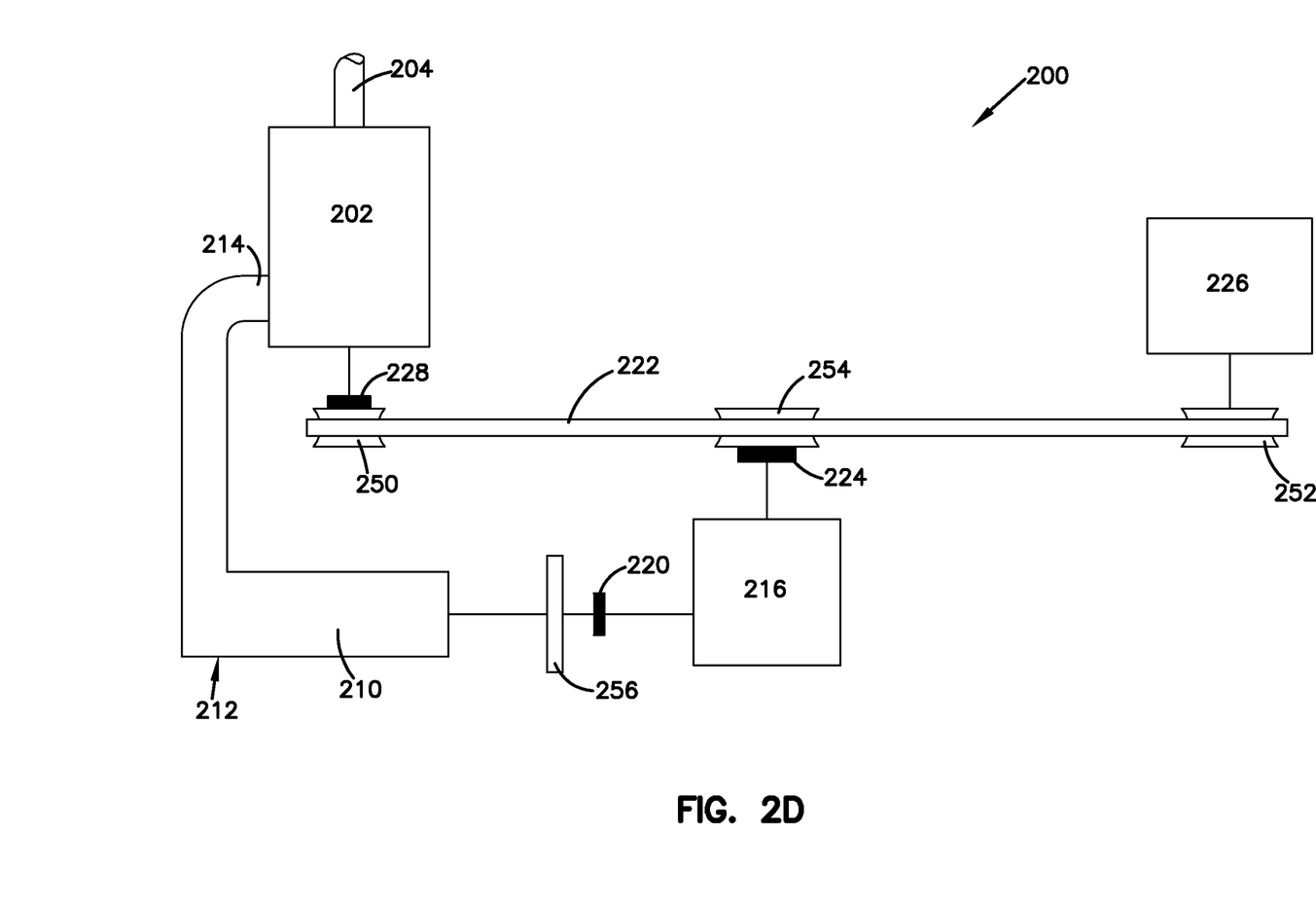
FIG. 2D depicts a vehicle drive system in a regeneration mode.

FIG. 2D depicts the system 200 in a regeneration mode. In the regeneration mode, the engine clutch 228 is engaged with the engine pulley 250, the motor clutch 224 is engaged with the motor pulley 254, and the supercharger clutch 220 is disengaged from the supercharger drive 256. Accordingly, the supercharger 210 is not operational and no compressed air is delivered to the engine 202. However, the engine power delivered to the motor 216 via the drive belt 222 is converted into electrical power and stored at the battery (not shown). Engine power also drives the accessories 226.

Figure 2E:
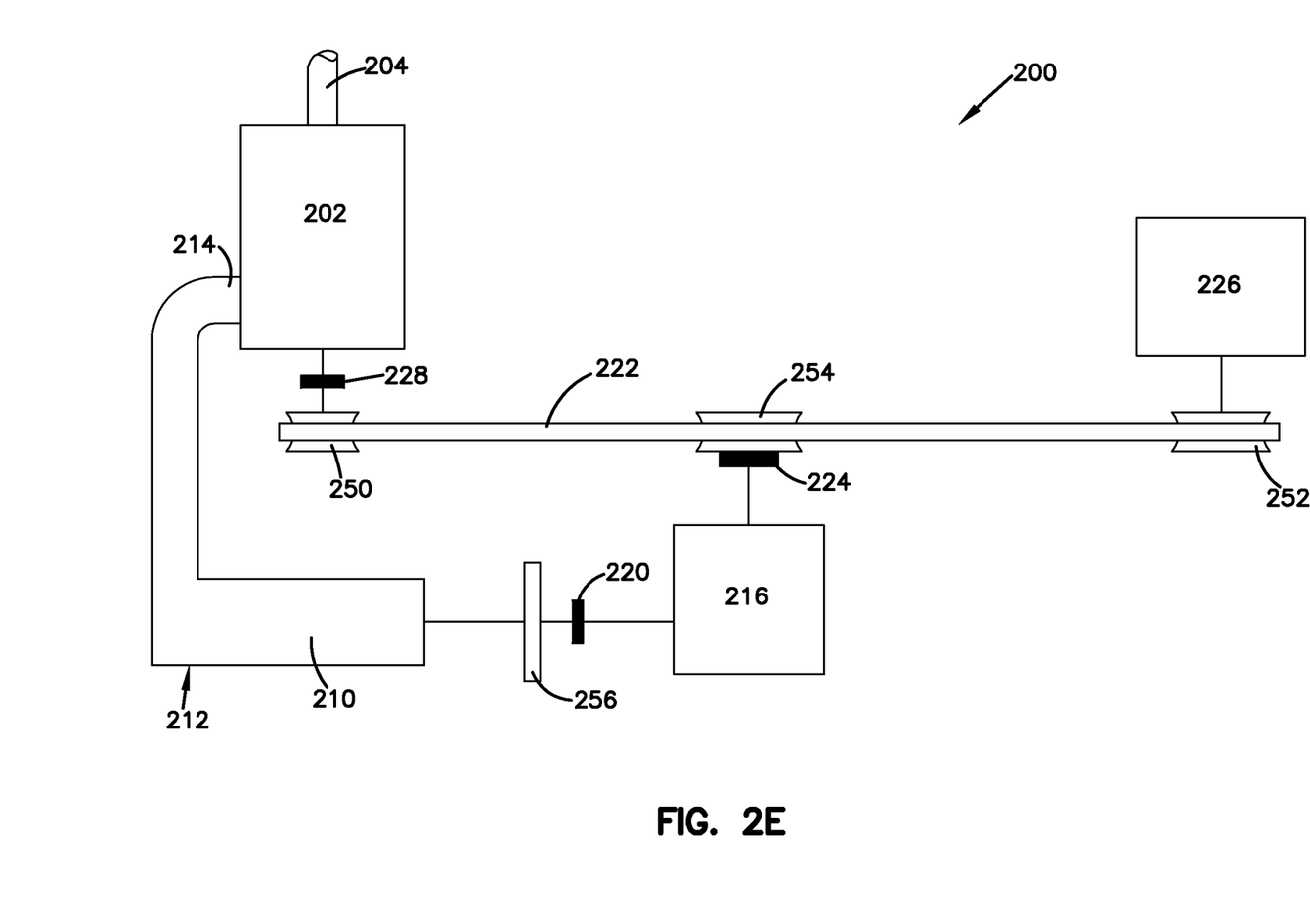
FIG. 2E depicts a vehicle drive system in an engine-off mode.

FIG. 2E depicts the system 200 in an engine-off mode, which typically occurs at vehicle stop or idle. In the engine-off mode, the engine clutch 228 is disengaged from the engine pulley 250, the motor clutch 224 is engaged with the motor pulley 254, and the supercharger clutch 220 is disengaged from the supercharger drive 256. This mode allows accessories 226, such as vehicle air conditioning, alternator, power steering, etc., to continue to run in the absence of power from the engine 202. Since the engine 202 is not operational in this mode, compressed air need not be delivered by the supercharger 210. Accordingly, disengaging the supercharger 210 helps reduce electrical load on the motor 216. Power is provided to the motor 216 by the battery (not shown).

In other embodiments, to further reduce engine or motor load, an accessory clutch may be selectively engageable with the accessory pulley 254. In such an embodiment, a "need" condition may be sent to the CPU from the accessory 226, indicating power to the accessory 226 is needed. In the absence of a need condition, the accessory pulley 252 may be disengaged from the accessory clutch. This would also reduce engine or motor load in other operational modes. Other embodiments may reduce motor load by shutting down the motor 216 when no need condition is present, regardless of whether or not the accessory clutch is selectively engageable with the accessory pulley 254. If the system 200 is in the engine-off mode and there is no need condition present, the motor 216 may cease delivering mechanical power to the belt 222.

Figure 3:
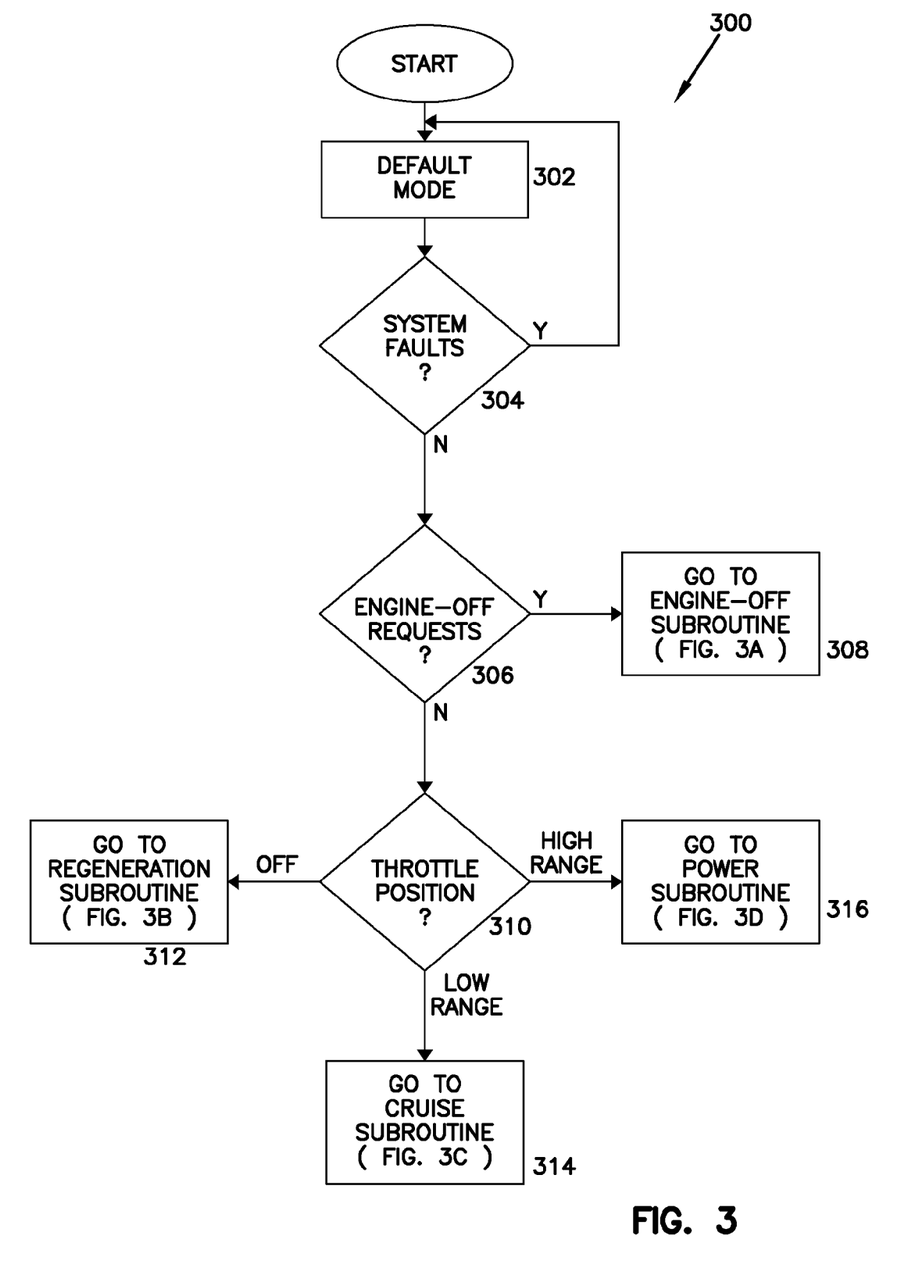
FIG. 3 depicts a logic control routine for a vehicle drive system.

FIG. 3 depicts a logic control routine 300 for a vehicle drive system. The initial operational mode of the vehicle is a DEFAULT mode 302. As described briefly above, when in the DEFAULT mode 302, the vehicle is operational in a basic state. In the DEFAULT mode, the engine provides operational power to all of the accessories, the motor/generator, and the supercharger. Once in the initial DEFAULT mode 302, the routine 300 first performs checks to determine if any system faults are present 304. This review of system conditions to determine faults is enabled to ensure that the vehicle drive system may effectively be changed from the DEFAULT mode 302 to one of the other operational modes. The presence of any system faults will compel the routine 300 to revert back to the DEFAULT mode 302. In fact, it may be desirable to monitor for system faults on a continuous loop during operation of the vehicle. Accordingly, any number of system faults that are identified at any time during vehicle operation may cause the routine 300 to return to the DEFAULT mode 302. These system faults may include an anti-lock brake system event (that is, the vehicle has entered a skid requiring traction control). In such a case, it may be desirable to revert to the DEFAULT mode to avoid, e.g., an over-engine brake condition in a REGENERATION mode, or an over-power condition in a POWER mode. Additional system faults may include engine temperatures in excess of a particular threshold, inadequate air conditioning compressor pressure, out-of-range or failure signals from a sensor, etc.

If no system faults are present, the routine 300 next determines if an engine-off request has been made 306. The routine 300 may determine that an engine-off request has been made by considering, e.g., vehicle speed and throttle position. A throttle OFF position coupled with a vehicle speed of zero MPH may, in certain embodiments, be considered an engine-off request. Other factors to consider would be apparent to a person of skill in the art. If such a request has been made, an engine-off subroutine is entered 308. If such a request has not been made, the routine 300 next determines an engine throttle position 310. If the throttle is in an OFF position, a regeneration subroutine is entered 312. If the throttle is in a LOW RANGE position, a cruise subroutine is entered 314. If the throttle position is in a HIGH RANGE position, a power subroutine is entered 316. The LOW and HIGH ranges may be defined as required or desired for a particular application. For example, in the medium-duty truck category (for example, box trucks having vehicle weights of about 10,000 to about 50,000 lbs.), it has been determined that the low range may be greater than about 0% (i.e., the off position) up to about 69%. The high range may include throttle positions greater than about 69% and up to 100% open. Other ranges are contemplated and would be apparent to a person of skill in the art. Of course, as the vehicle system is set in a particular mode, the controller engages or disengages the various clutches, as described above.

Figure 3A:
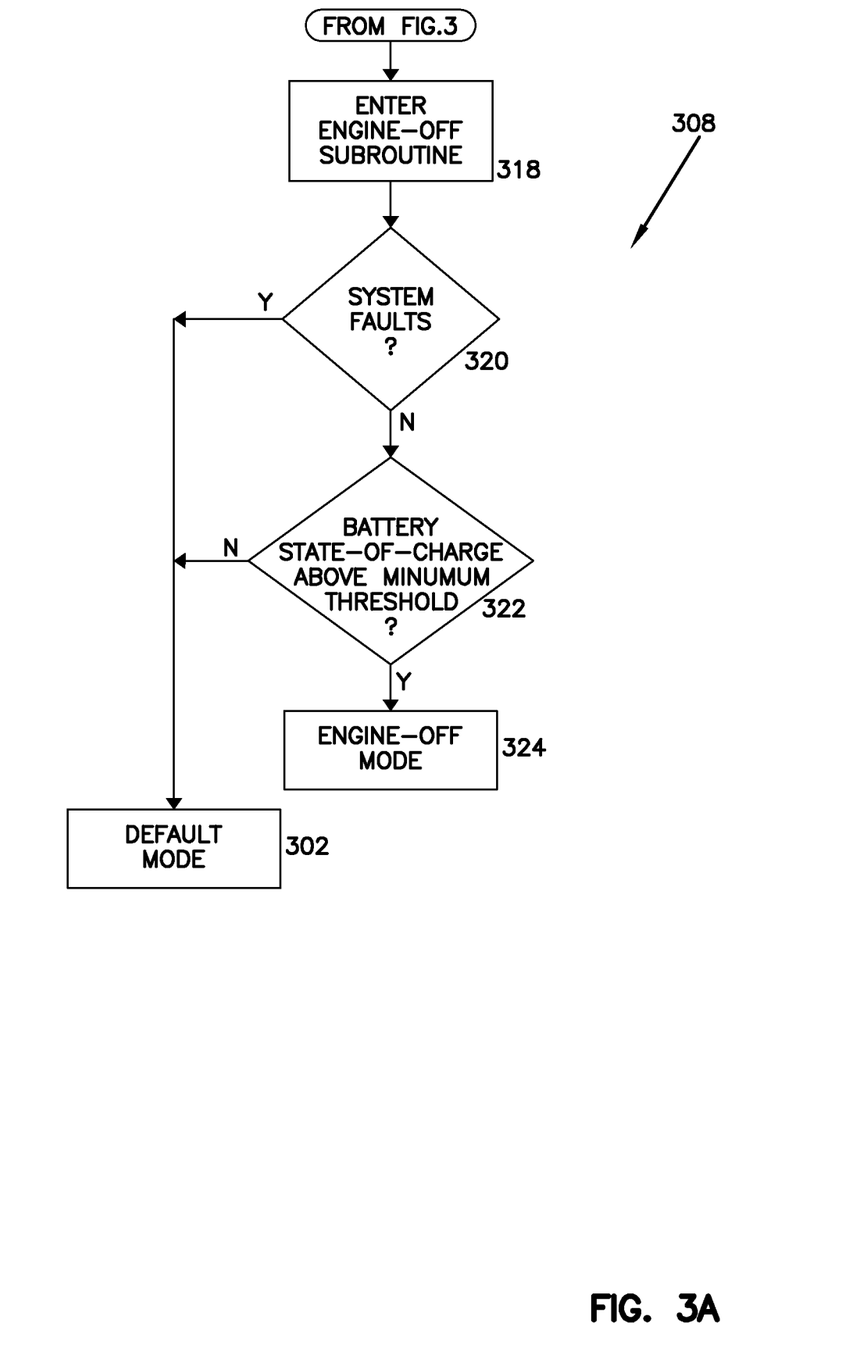
FIG. 3A depicts an engine-off subroutine of the logic control diagram of FIG. 3.

FIG. 3A depicts the engine-off subroutine 308. Upon entering 318 the engine-off subroutine 308, a system fault check 320 is performed. This system fault check 320 may be similar to the system fault check 304 described above with regard to FIG. 3. Indeed, the vehicle system may be constantly monitored for the presence of system faults. The existence thereof reverts the vehicle drive system to the DEFAULT mode 302. If no system faults are present, the engine-off subroutine 308 next determines if the battery state-of-charge is greater than a minimum threshold 322. If the state of charge is not above a minimum threshold, the drive system reverts to the DEFAULT mode 302, so as to prevent further power drain from the battery. If the state-of-charge is above the minimum threshold, the drive system enters the ENGINE-OFF mode 324. The threshold may be set as required or desired for a particular application and, for example, may contemplate storing a minimum amount of battery charge at all times. Alternatively, the minimum threshold may be no charge. Acceptable thresholds may be based on issues related to battery technology or type, desired battery life, battery capacities or temperature thresholds, motor conditions, inverter conditions, etc. Of course, other factors may be considered in making the determination if the vehicle system should be set in ENGINE-OFF mode 324. For example, the controller may query a sensor associated with the drive wheels to determine if the wheels are rotating (thus indicating that the vehicle is moving and not at stop). Other factors are contemplated and would be apparent of a person of skill in the art.

Figure 3B:
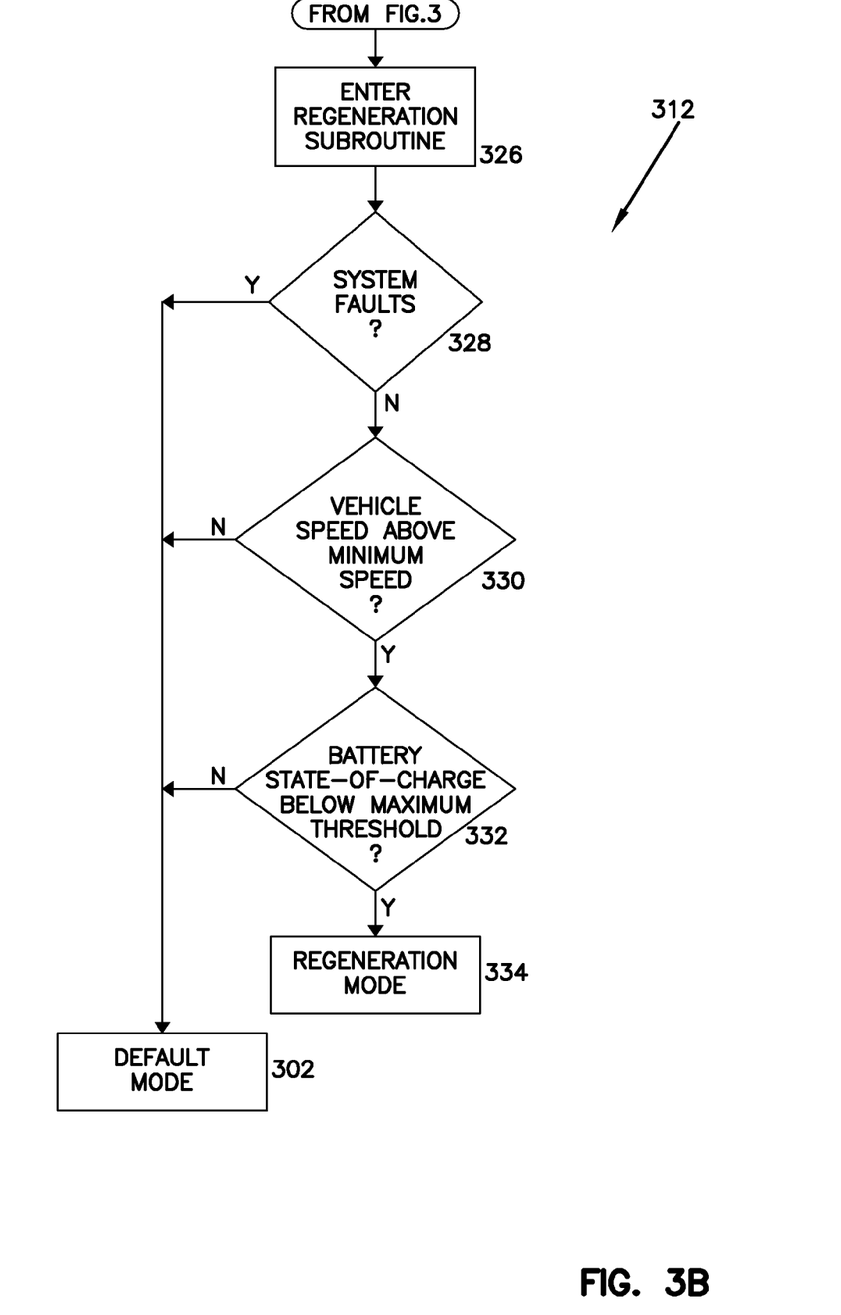
FIG. 3B depicts a regeneration subroutine of the logic control diagram of FIG. 3.

FIG. 3B depicts the regeneration subroutine 312. Upon entering 326 the regeneration subroutine 312, a system fault check 328 is performed. This system fault check 328 may be similar to the system fault checks described above. The existence of a system fault reverts the vehicle drive system to the DEFAULT mode 302. If no system faults are present, the regeneration subroutine 312 next determines if the vehicle speed is above a minimum speed 330. If not, the drive system reverts to the DEFAULT mode 302. If so, the regeneration subroutine 312 determines if the battery state-of-charge is below a maximum threshold 322. If not, the drive system reverts to the DEFAULT mode 302. Alternatively, the drive system is set to the REGENERATION mode 334. In general, in most circumstances where the vehicle is moving and the battery state of charge is less than a determined maximum for the battery, the drive system will be set to the REGENERATION mode 334, thus enabling vehicle kinetic energy to be recaptured as electrical power and stored in the battery.

Figure 3C:
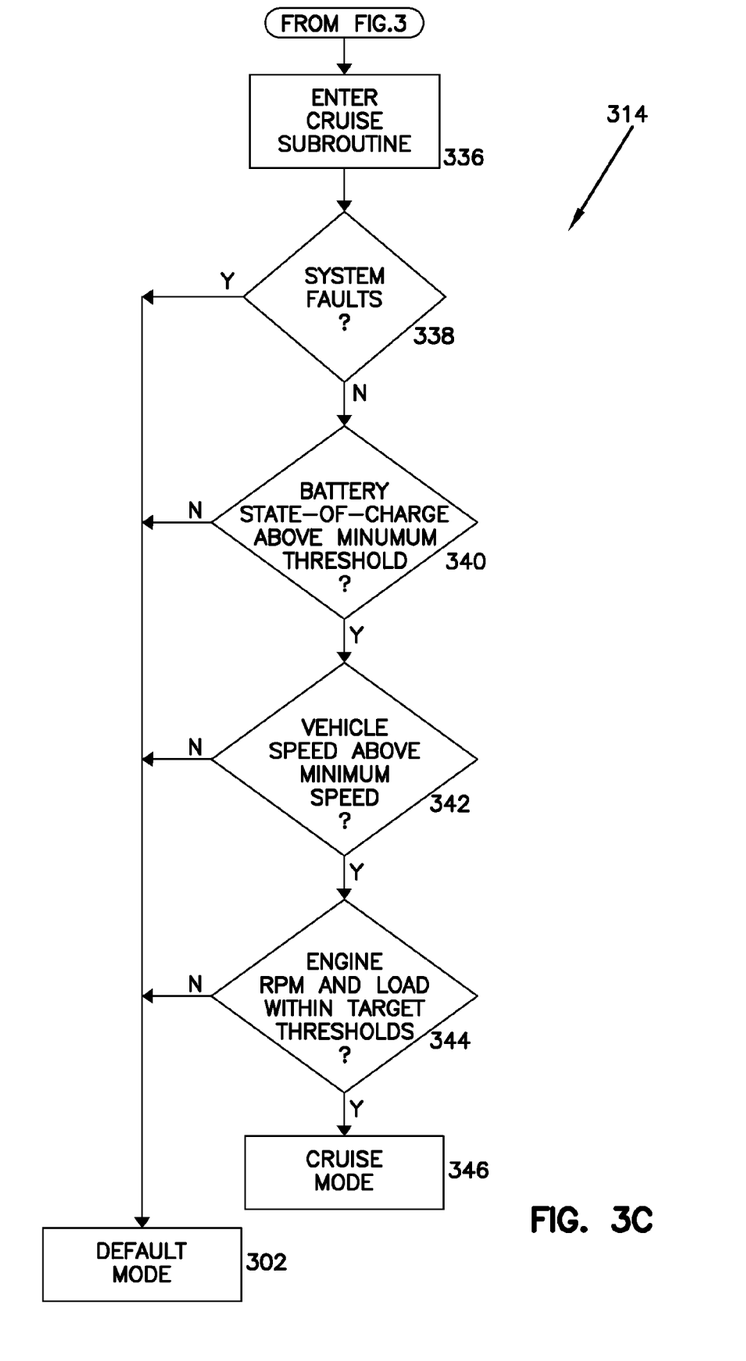
FIG. 3C depicts a cruise subroutine of the logic control diagram of FIG. 3.

FIG. 3C depicts the cruise subroutine 314. Upon entering 336 the cruise subroutine 312, a system fault check 338 is performed. This system fault check 338 may be similar to the system fault checks described above. The existence of a system fault reverts the vehicle drive system to the DEFAULT mode 302. If no system faults are present, the cruise subroutine 314 next determines if the battery state-of-charge is greater than a minimum threshold 340. If not, the vehicle drive system reverts to the DEFAULT mode 302. If so, the cruise subroutine 314 next determines if the vehicle speed is above a minimum speed 342. If not, the vehicle drive system reverts to the DEFAULT mode 302. If so, the cruise subroutine 314 next determines if the engine RPM and load are within target thresholds 344. If not, the vehicle drive system reverts to the DEFAULT mode 302. If so, the drive system is set in CRUISE mode 346. In general, CRUISE mode 346 is set whenever the vehicle is moving, but where additional power is not required due to load requirements or acceleration. Of course, CRUISE mode may be set under any other circumstances where the system has determined that the engine speed is higher than needed for efficient accessory operation.

Figure 3D:
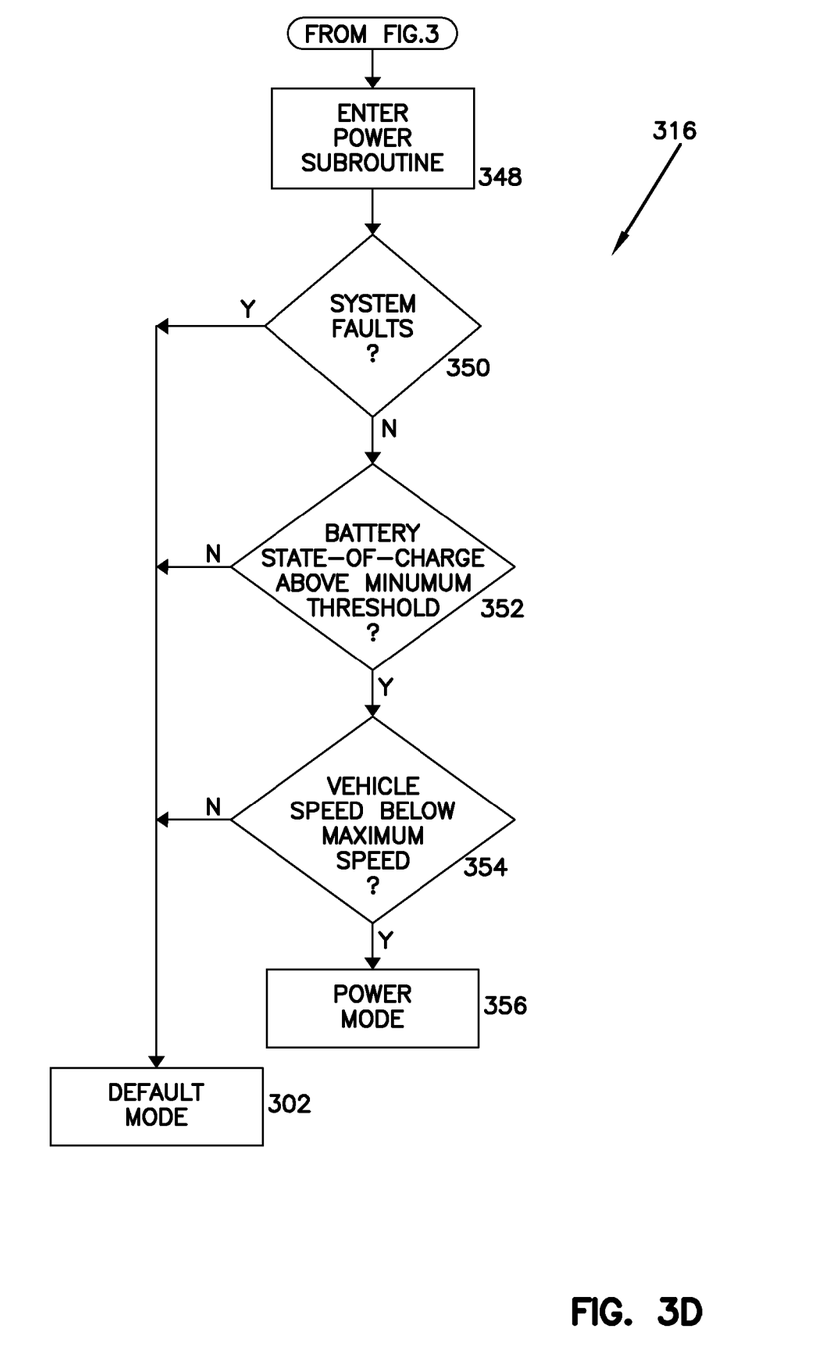
FIG. 3D depicts a power subroutine of the logic control diagram of FIG. 3.

FIG. 3D depicts the power subroutine 316. Upon entering 348 the power subroutine 316, a system fault check 350 is performed. This system fault check 350 may be similar to the system fault checks described above. The existence of a system fault reverts the vehicle drive system to the DEFAULT mode 302. If no system faults are present, the power subroutine 316 next determines if the battery state of charge is greater than a minimum threshold 352. If not, the vehicle drive system reverts to the DEFAULT mode 302. If so, the power subroutine 316 next determines if the vehicle speed is below a maximum speed 354. If not, the vehicle drive system reverts to the DEFAULT mode 302. If so, the drive system is set in POWER mode 356. In general, POWER mode 356 is set whenever the vehicle is moving, but where additional power is required due to load requirements or acceleration. This power can then be delivered regardless of engine RPM.

The controller or CPU may be an on-board vehicle computer that monitors and controls various engine components, issues warnings, etc. The CPU is loaded with the necessary software or firmware required for use of the system. In alternative configurations, software may be included on various types of storage media (CDs, DVDs, USB drives, etc.) for upload to a vehicle computer. Additionally, website addresses and passwords may be included for programs to be downloaded from a website on the internet.

The control algorithm technology described herein can be realized in hardware, software, or a combination of hardware and software. The technology described herein can be realized in a centralized fashion in one computer system or in a distributed fashion where different elements are spread across several interconnected computer systems. Additionally, the control system may be incorporated into the vehicle's main computer system. Any kind of computer system or other apparatus adapted for carrying out the methods described herein is suitable. A typical combination of hardware and software would be stand-alone device integrated into the engine control system that, when loaded and executed, controls the device such that it carries out the methods described herein. Since the technology is contemplated to be used on vehicles, a stand-alone hardware system including any necessary operator interfaces (system power, override, etc.) may be desirable. Diagnostic or maintenance functions may be loaded onto a separate PC, either stationary at a repair facility or on a laptop or other portable device. This would allow for trouble shooting and repair of potentially faulty vehicle drive systems, or the components utilized therewith.

The technology described herein also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While there have been described herein what are to be considered exemplary and preferred embodiments of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. A drive system for a vehicle, the drive system comprising:
    a drive belt;
    an engine selectively engageable with the drive belt;
    a motor selectively engageable with the drive belt;
    a supercharger for delivering compressed air to an intake of the engine, wherein the supercharger is selectively engageable with the motor; and
    a controller for setting an operational mode of the drive system,
        wherein when in a power mode, the controller engages the engine with the drive belt, the controller engages the supercharger with the motor so as to deliver compressed air from the supercharger to the intake of the engine, and the controller disengages the motor from the drive belt; and
        wherein when in a cruise mode, the controller disengages the engine from the drive belt, the controller engages the supercharger with the motor so as to deliver compressed air from the supercharger to the intake of the engine, and the controller engages the motor with the drive belt.

2. The drive system of claim 1,
    wherein when in a regeneration mode, the controller engages the engine with the drive belt, the controller disengages the supercharger from the motor, and the controller engages the motor with the drive belt.

3. The drive system of claim 2,
    wherein when in an engine off mode, the controller engages the motor with the drive belt, and the controller disengages the supercharger from the motor.

4. The drive system of claim 1, further comprising at least one accessory engaged with the drive belt.

5. The drive system of claim 3, further comprising an inverter electrically coupled to the motor and a battery electrically coupled to the inverter.

6. The drive system of claim 5, wherein when in each of the power mode and the cruise mode, the battery delivers electrical power to the motor.

7. The drive system of claim 3, wherein when in the engine off mode, the battery delivers electrical power to the motor based on a need condition of at least one accessory.

8. The drive system of claim 1, further comprising an engine clutch for engaging the engine with the drive belt, a motor clutch for engaging the motor with the drive belt, and a supercharger clutch for engaging the supercharger with the motor.

9. The drive system of claim 1, wherein the controller sets the operation state based on at least one of an engine load, a requested torque, a voltage state, an engine RPM, and a need condition.

10. The drive system of claim 4, further comprising a sensor associated with at least one of the engine, the accessories, the motor, and the supercharger, wherein the sensor sends a signal to the controller.

11. A method of setting an operational mode of a drive system comprising a drive belt, an engine, a motor, and a supercharger for delivering compressed air to an intake of the engine, and a controller for setting the operational mode of the drive system, the method comprising:

wherein when in a power mode, the controller engages the engine with the drive belt, the controller engages the supercharger with the motor so as to deliver compressed air from the supercharger to the intake of the engine, and the controller disengages the motor from the drive belt;

wherein when in a cruise mode, the controller disengages the engine from the drive belt, the controller engages the supercharger with the motor so as to deliver compressed air from the supercharger to the intake of the engine, and the controller engages the motor with the drive belt;

wherein when in a regeneration mode, the controller engages the engine with the drive belt, the controller disengages the supercharger from the motor, and the controller engages the motor with the drive belt; and wherein when in an engine-off mode, the controller engages the motor from the drive belt, the controller disengages the supercharger from the motor, and the controller disengages the supercharger from the motor.

12. The method of claim 11, wherein the controller sets the drive system to the power mode based at least in part on a throttle position signal.

13. The method of claim 1, wherein the controller sets the drive system to the cruise mode based at least in part on an engine RPM signal and a load signal.

14. The method of claim 11, wherein the controller sets the drive system to the regeneration mode based at least in part on a state-of-charge of a battery.

15. The method of claim 11, wherein the controller sets the drive system to the engine-off mode based at least in part on a state-of-charge of a battery and a need condition.

16. The method of claim 11, wherein the controller sends a signal to at least one of an engine clutch for engaging the engine with the drive belt, a motor clutch for engaging the motor with the drive belt, and a supercharger clutch for engaging the supercharger with the motor, based on a set operational mode.

* * * * *